(12) United States Patent
Zhu et al.

(10) Patent No.: US 12,506,394 B2
(45) Date of Patent: Dec. 23, 2025

(54) MULTI-ROTOR DIRECT DRIVE TRANSMISSION SYSTEM

(71) Applicant: AAC Technologies (Nanjing) Co., Ltd., Nanjing (CN)

(72) Inventors: Xueyuan Zhu, Nanjing (CN); Shun Guo, Nanjing (CN); Weiling Shi, Nanjing (CN); Lin Qian, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 273 days.

(21) Appl. No.: 18/331,117

(22) Filed: Jun. 7, 2023

(65) Prior Publication Data

US 2024/0178735 A1    May 30, 2024

Related U.S. Application Data

(63) Continuation of application No. PCT/CN2023/071749, filed on Jan. 10, 2023.

(30) Foreign Application Priority Data

Nov. 29, 2022    (CN) .......................... 202223186564.8

(51) Int. Cl.
| | |
|---|---|
| *H02K 41/02* | (2006.01) |
| *H02K 11/21* | (2016.01) |
| *H02K 11/30* | (2016.01) |

(52) U.S. Cl.
CPC ............. *H02K 41/02* (2013.01); *H02K 11/21* (2016.01); *H02K 11/30* (2016.01)

(58) Field of Classification Search
CPC ......... H02K 41/02; H02K 11/21; H02K 11/30
USPC ............................................ 310/12.19, 12.01
See application file for complete search history.

(56) References Cited

U.S. PATENT DOCUMENTS

2017/0274788 A1 *    9/2017    Zhang ..................... B60L 53/66

FOREIGN PATENT DOCUMENTS

| CN | 104113180 A | * | 10/2014 | |
|---|---|---|---|---|
| CN | 109950981 A | * | 6/2019 | |
| CN | 111049354 A | * | 4/2020 | |
| CN | 111917268 A | * | 11/2020 | ............. H01R 41/00 |
| JP | H09266659 A | * | 10/1997 | |

* cited by examiner

*Primary Examiner* — Jose A Gonzalez Quinones
(74) *Attorney, Agent, or Firm* — Wiersch Law Group (57) ABSTRACT

The present disclosure provides a multi-rotor direct drive transmission system, which includes multiple stator units, a guide rail, and multiple rotor units. Each of the multiple stator units includes a stator and a magnetic steel, and the guide rail is attached to the stator. Each of the multiple rotor units includes a rotor, a winding, a drive device, and a power supply unit. The winding is spaced from and arranged directly opposite to the magnetic steel, and the winding is configured to drive the magnetic steel. The drive device is electrically connected to the winding, and the drive device is connected to the control system by wireless communication. The multi-rotor direct drive transmission system further includes a conductive strip. The power supply unit is a movable cable. The multi-rotor direct drive transmission system of the present disclosure is simple in structure, and is easy to control and use.

9 Claims, 8 Drawing Sheets

MULTI-ROTOR DIRECT DRIVE TRANSMISSION SYSTEM

CROSS REFERENCE TO RELATED APPLICATIONS

The present application is a continuation of PCT Patent Application No. PCT/CN2023/071749, entitled "MULTI-ROTOR DIRECT DRIVE TRANSMISSION SYSTEM," filed Jan. 10, 2023, which claims priority to Chinese patent application No. 202223186564.8, entitled "MULTI-ROTOR DIRECT DRIVE TRANSMISSION SYSTEM," filed Nov. 29, 2022, each of which is incorporated by reference herein in its entirety, which is incorporated herein by reference in its entirety.

TECHNICAL FIELD

The present disclosure relates to the technical field of electroacoustic transducing, in particular to a multi-rotor direct drive transmission system applied to a portable electronic product.

BACKGROUND

With the increasing importance of the application of assembly lines in production, a multi-rotor direct drive transmission system has become an important production equipment on the assembly line.

The multi-rotor direct drive transmission system in the conventional art includes multiple segments, multiple rotors installed on a stator, and multiple drivers. The stator includes a coil winding, the rotor includes a magnetic steel, which is spaced and arranged opposite to the coil winding. The coil winding drives the magnetic steel to cause the rotor to move, and the multiple drivers are electrically connected to the coil winding to control the coil winding, to drive the magnetic steel.

However, in the conventional art, in response to the multi-rotor direct drive transmission system operating the stator to move to the multiple stators at different positions, adjacent multiple stators need to switch control between the stators, resulting in frequent power on and power off states for the stator arranged directly opposite to the rotor when the rotor passes by. Therefore, each stator of the multi-rotor direct drive transmission system in the conventional art needs to be matched with a driver, resulting in a complex structure of the multi-rotor direct drive transmission system in the conventional art, so that too many devices are involved, and a control system used to control the multiple drivers is relatively complex.

Therefore, it is necessary to provide a new multi-rotor direct drive transmission system to solve the above technical problems.

SUMMARY

An objective of the present disclosure is to overcome the above technical problems and provide a multi-rotor direct drive transmission system with a simple structure, which is easy to control and use.

In order to achieve the above objective, in a first aspect, a multi-rotor direct drive transmission system is provided according to the embodiments of the present disclosure, where the multi-rotor direct drive transmission system is in data communication with an external control system and powered by an external power supply. The multi-rotor direct drive transmission system includes multiple stator units connected in sequence, a guide rail attached to the multiple stator units, and multiple rotor units forming a sliding connection with the guide rail. Each of the multiple stator units includes a stator made of a conductive magnet and a magnetic steel fixed to the stator, and the guide rail is attached to the stator. Each of the multiple rotor units includes a rotor made of a conductive magnet, a winding fixed to the rotor, a drive device, and a power supply unit, and the rotor forms a sliding connection with the guide rail. The winding is spaced and arranged directly opposite to the magnetic steel, and the winding is configured to drive the magnetic steel to cause the each of the multiple rotor units to move along the guide rail. The drive device is electrically connected to the winding to control the winding to be powered on or powered off, and the drive device is connected to the external control system by wireless communication for data communication. The multi-rotor direct drive transmission system further includes a conductive strip configured to be connected to the external power supply, and the conductive strip is arranged in a spaced manner with the multiple stator units and arranged in a direction parallel to an extending direction of the multiple stator units. The power supply unit is a movable cable, one end of the power supply unit is electrically connected to the winding and the drive device, respectively, and the other end of the power supply unit is slidably connected to the conductive strip to form a movable conductive structure.

As an improvement, each of the multiple rotor units further includes a first position feedback device fixed to the rotor, and the first position feedback device is electrically connected to the power supply unit. Each of the multiple stator units further includes a second position feedback device fixed to the stator, and the second position feedback device is in data communication with the external control system. The first position feedback device and the second position feedback device are arranged opposite to each other, to cause the second position feedback device to sense position information of the first position feedback device and send the position information to the external control system.

As an improvement, there are two guide rails parallel arranged and spaced along the extending direction of the multiple stator units, the two guide rails are located on a same horizontal surface, and the first position feedback device, the second position feedback device, the winding, and the magnetic steel are all located between the two guide rails.

As an improvement, the power supply unit includes a first segment fixed to the rotor, a second segment bending and extending from the first segment towards a direction away from the rotor, and a third segment bending and extending from the second segment; the third segment is in sliding connection with the conductive strip to form a movable conductive structure.

In a second aspect, a multi-rotor direct drive transmission system is provided according to the embodiments of the present disclosure, where the multi-rotor direct drive transmission system is in data communication with an external control system, the multi-rotor direct drive transmission system includes multiple stator units connected in sequence, a guide rail attached to the multiple stator units, and multiple rotor units forming a sliding connection with the guide rail. Each of the multiple stator units includes a stator made of a conductive magnet and a magnetic steel fixed to the stator, and the guide rail is attached to the stator. Each of the multiple rotor units includes a rotor made of a conductive magnet, a winding fixed to the rotor, a drive device, and a power supply unit, and the rotor forms a sliding connection with the guide rail. The winding is spaced and arranged directly opposite to the magnetic steel, the winding is configured to drive the magnetic steel to cause the each of the multiple rotor units to move along the guide rail, the drive device is electrically connected to the winding to control the winding to be powered on or powered off, and the drive device is connected to the external control system by wireless communication for data communication. The power supply unit is a battery, and the power supply unit is electrically connected to the winding and the drive device, respectively.

As an improvement, each of the multiple rotor units further includes a first position feedback device fixed to the rotor, and the first position feedback device is electrically connected to the power supply unit; each of the multiple stator units further includes a second position feedback device fixed to the stator, and the second position feedback device is in data communication with the external control system. The first position feedback device and the second position feedback device are arranged opposite to each other, to cause the second position feedback device to sense position information of the first position feedback device and send the position information to the external control system.

As an improvement, there are two guide rails parallel arranged and spaced along the extending direction of the multiple stator units, the two guide rails are located on a same horizontal surface, and the first position feedback device, the second position feedback device, the winding, and the magnetic steel are all located between the two guide rails.

In a third aspect, a multi-rotor direct drive transmission system is provided according to the embodiments of the present disclosure, where the multi-rotor direct drive transmission system is in data communication with an external control system, the multi-rotor direct drive transmission system includes multiple stator units connected in sequence, a guide rail attached to the multiple stator units, and multiple rotor units forming a sliding connection with the guide rail. Each of the multiple stator units includes a stator made of a conductive magnet and a magnetic steel fixed to the stator, and the guide rail is attached to the stator. Each of the multiple rotor units includes a rotor made of a conductive magnet, a winding fixed to the rotor, a drive device, and a power supply unit, and the rotor forms a sliding connection with the guide rail. The winding is spaced and arranged directly opposite to the magnetic steel, the winding is configured to drive the magnetic steel to cause the each of the multiple rotor units to move along the guide rail, the drive device is electrically connected to the winding to control the winding to be powered on or powered off, and the drive device is connected to the external control system by wireless communication for data communication. The power supply unit is a wireless chargeable battery, and the power supply unit is electrically connected to the winding and the drive device, respectively. The multi-rotor direct drive transmission system further includes a wireless charging device configured to wireless charge the power supply unit, and at least a part of stroke by which the power supply unit moves and extends along the guide rail is in a wireless charging range of the wireless charging device.

As an improvement, each of the multiple rotor units further includes a first position feedback device fixed to the rotor, and the first position feedback device is electrically connected to the power supply unit; each of the multiple stator units further includes a second position feedback device fixed to the stator, and the second position feedback device is in data communication with the external control system. The first position feedback device and the second position feedback device are arranged opposite to each other, to cause the second position feedback device to sense position information of the first position feedback device and send the position information to the external control system.

As an improvement, there are two guide rails parallel arranged and spaced along the extending direction of the multiple stator units, the two guide rails are located on a same horizontal surface, and the first position feedback device, the second position feedback device, the winding, and the magnetic steel are all located between the two guide rails.

Compared with the conventional art, the multi-rotor direct drive transmission system provided according to the present disclosure provides a magnetic steel in a stator unit, a winding in the rotor unit, where the winding is spaced and arranged opposite to the magnetic steel. The winding drives the magnetic steel to cause the rotor unit to move along the guide rail. This structure uses fewer devices and has a simple structure, which is beneficial for reducing costs. The multi-rotor direct drive transmission system of the present disclosure is provided with a drive device and a power supply unit in the rotor unit, and the structure is directly controlled by the rotor unit to power on or off the winding, so that the control system is relatively simple, which is conducive to realize easy control and use of the multi-rotor direct drive transmission system of the present disclosure. Furthermore, the power supply unit is provided in multiple forms of power supply, including the movable cable, the battery, and the wireless chargeable battery, which is beneficial for the implementation of the multi-rotor direct drive transmission system of the present disclosure to be easy to control and use.

BRIEF DESCRIPTION OF THE DRAWINGS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be acquired based on the provided drawings without any creative efforts.

DETAILED DESCRIPTION

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all the embodiments. Based on the embodiments of the present disclosure, all other embodiments obtained without creative efforts by those of ordinary skill in the art shall fall within the protection scope of the present disclosure.

First Embodiment

The embodiment of the present disclosure provides a multi-rotor direct drive transmission system 100. The multi-rotor direct drive transmission system 100 is in data communication with an external control system 200. The multi-rotor direct drive transmission system 100 is powered by an external power supply 300.

Reference is simultaneously made to FIG. 1 to FIG. 4. Specifically, the multi-rotor direct drive transmission system 100 includes multiple stator units 1, a guide rail 2, a rotor unit 3, and a conductive strip 4.

The multiple stator units 1 are sequentially connected to form a whole piece.

Each of the multiple stator units 1 includes a stator 11, a magnetic steel 12, and a second position feedback device 13.

The stator 11 is made of a conductive magnet.

The magnetic steel 12 is fixed to the stator 11. The magnetic steel 12 is located on a side of the stator 11 close to the rotor unit 3, that is, the magnetic steel 12 and the guide rail 2 are located on the same side of the stator 11. There are multiple magnetic steels 12, and the multiple magnetic steel 12 are sequentially connected to form a whole piece.

The second position feedback device 13 is fixed to the stator 11. The second position feedback device 13 is in data communication with the external control system 200. The second position feedback device 13 is configured to sense position of the rotor unit 3 and send the position of the rotor unit 3 to the external control system 200.

The guide rail 2 is attached to the stator unit 1. Specifically, the guide rail 2 is attached to the stator 11.

There are two guide rails 2. The two guide rails 2 are parallel arranged and spaced along the extending direction of the multiple stator units 1. The two guide rails 2 are located on the same horizontal surface, which is beneficial for the smooth movement of the rotor unit 3.

The rotor unit 3 forms a sliding connection with the guide rail 2.

There are multiple rotor units 3, which are beneficial for improving the efficiency of the multi rotor direct drive transmission system 100. Of course, not limited to this, it is also possible to provide only one rotor unit 3.

Specifically, each of the multiple rotor units 3 includes a rotor 31, a winding 32, a drive device 33, a power supply unit 34, and a first position feedback device 35.

The rotor 31 is made of a conductive magnet. The rotor 31 forms a sliding connection with the guide rail 2.

The winding 32 is fixed to the rotor 31. The winding 32 is spaced from and arranged directly opposite to the magnetic steel 12. The winding 32 is configured to drive the magnetic steel 12 to cause the rotor unit 3 to move along the guide rail 2.

The drive device 33 is electrically connected to the winding 32 to control the winding 32 to be powered on or powered off, and the drive device 33 is connected to the external control system 200 by wireless communication for data communication. In this way, the stator is prevented from being powered on and powered off frequently, and the winding 32 is directly controlled to be power on or power off by the rotor unit 3, so that the external control system 200 is simple, which is conducive to the easy control and use of the multi-rotor direct drive transmission system 100 of the present disclosure. In addition, the multi-rotor direct drive transmission system 100 uses fewer devices, has a simple structure, which is conducive to reducing costs.

The power supply unit 34 is configured to be connected to the external power supply 300. The external power supply 300 is configured to supply power to the rotor unit 3 by the power supply unit 34.

In the first embodiment, the power supply unit 34 is a movable cable. One end of the power supply unit 34 is electrically connected to the winding 32 and the drive device 33 respectively, and the other end of the power supply unit 34 is slidably connected to the conductive strip 4 to form a movable conductive structure. The movable conductive structure can control the winding 32 to be powered on or powered off, so that the external control system 200 is simple, which is conducive to the easy control and use of the multi-rotor direct drive transmission system 100 of the present disclosure.

Specifically, the power supply unit 34 includes a first segment 341 fixed to the motor 31, a second segment 342 bending and extending from the first segment 341 towards a direction away from the motor 31, and a third segment 343 bending and extending from the second segment 342. The third segment 343 is slidably connected to the conductive strip 4 to form a movable conductive structure, which is conducive to realizing that the power supply unit 34 moves with the rotor unit 3 and has a simple structure.

The first position feedback device 35 is fixed to the rotor 31. The first position feedback device 35 is electrically connected to the power supply unit 34.

The first position feedback device 35, the second position feedback device 13, the winding 32, and the magnetic steel 12 are all located between the two guide rails 2. The first position feedback device 35 and the second position feedback device 13 are arranged opposite to each other, to cause the second position feedback device 13 to sense position information of the first position feedback device 35 and send the position information to the external control system 200.

The conductive strip 4 is configured to be connected to the external power supply 300. The conductive strip 4 is spaced apart from the stator unit 1 and arranged in a direction parallel to an extending direction of the stator unit 1.

Second Embodiment

Figure 1:
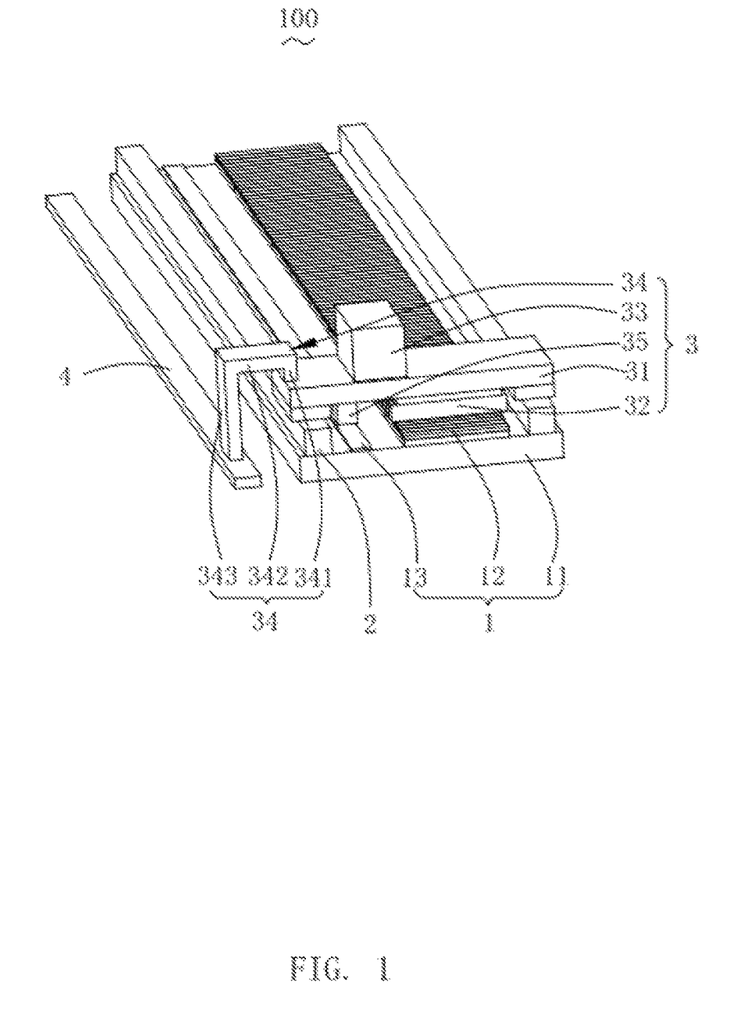
FIG. 1 is a schematic three-dimensional structural view of a multi-rotor direct drive transmission system in a first embodiment of the present disclosure.
Figure 2:
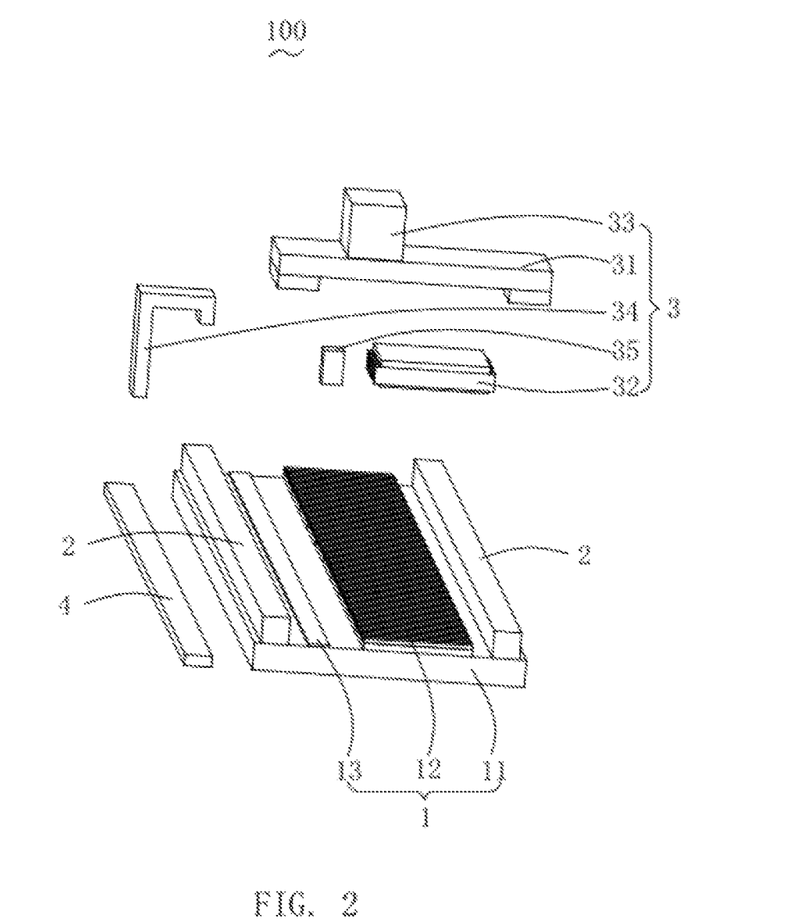
FIG. 2 is a partial three-dimensional explosive view of the multi-rotor direct drive transmission system in the first embodiment of the present disclosure
Figure 3:
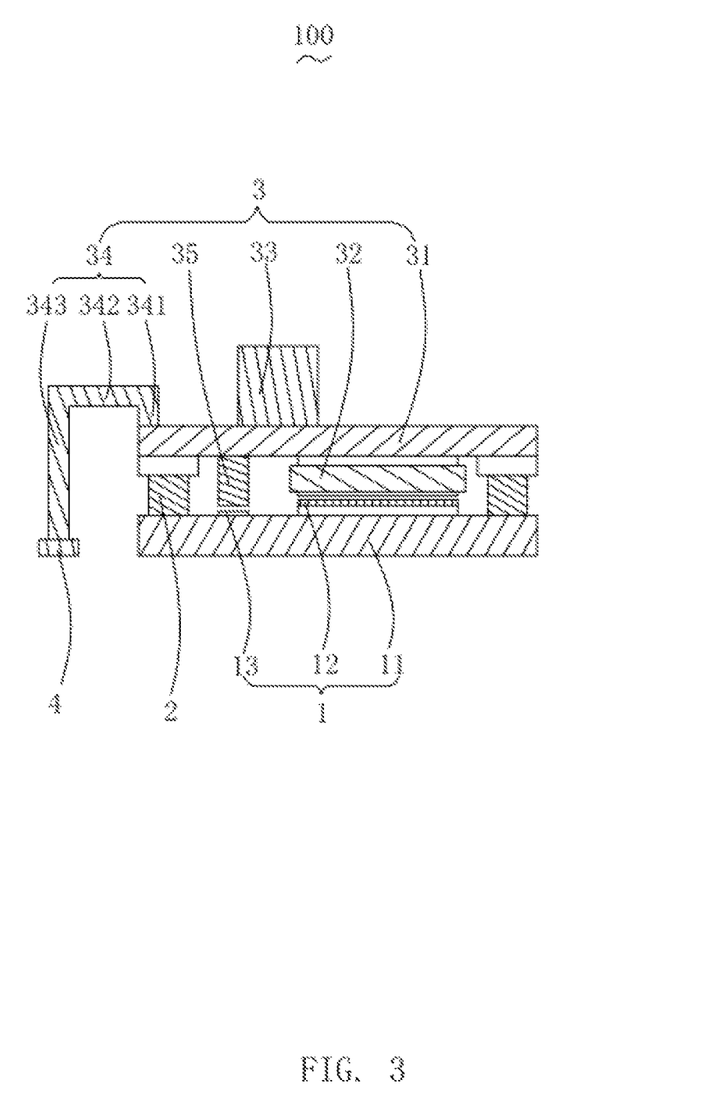
FIG. 3 is a schematic structural view of another angle of the multi-rotor direct drive transmission system in the first embodiment of the present disclosure.
Figure 4:
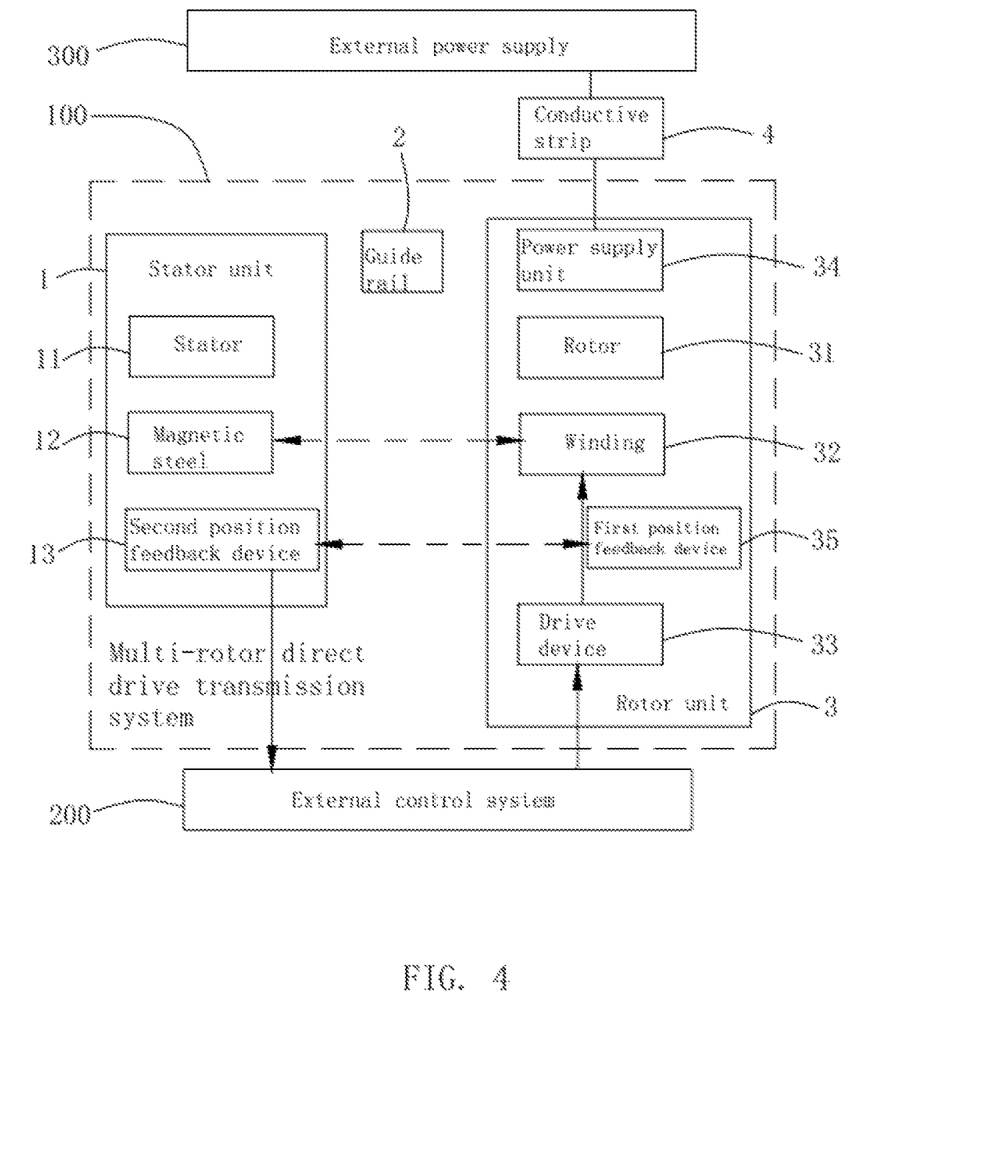
FIG. 4 is a block diagram of application relationship structure diagram of the multi-rotor direct drive transmission system in the first embodiment of the present disclosure.
Figure 5:
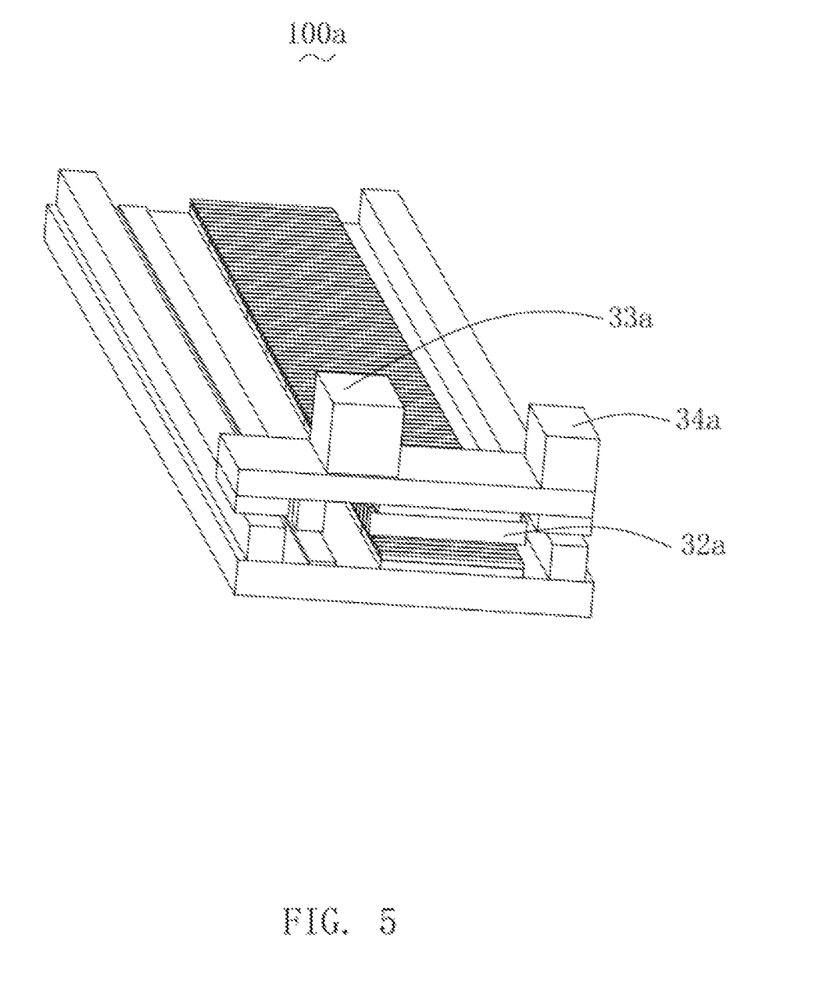
FIG. 5 is a schematic three-dimensional structural view of a multi-rotor direct drive transmission system in a second embodiment of the present disclosure.
Figure 6:
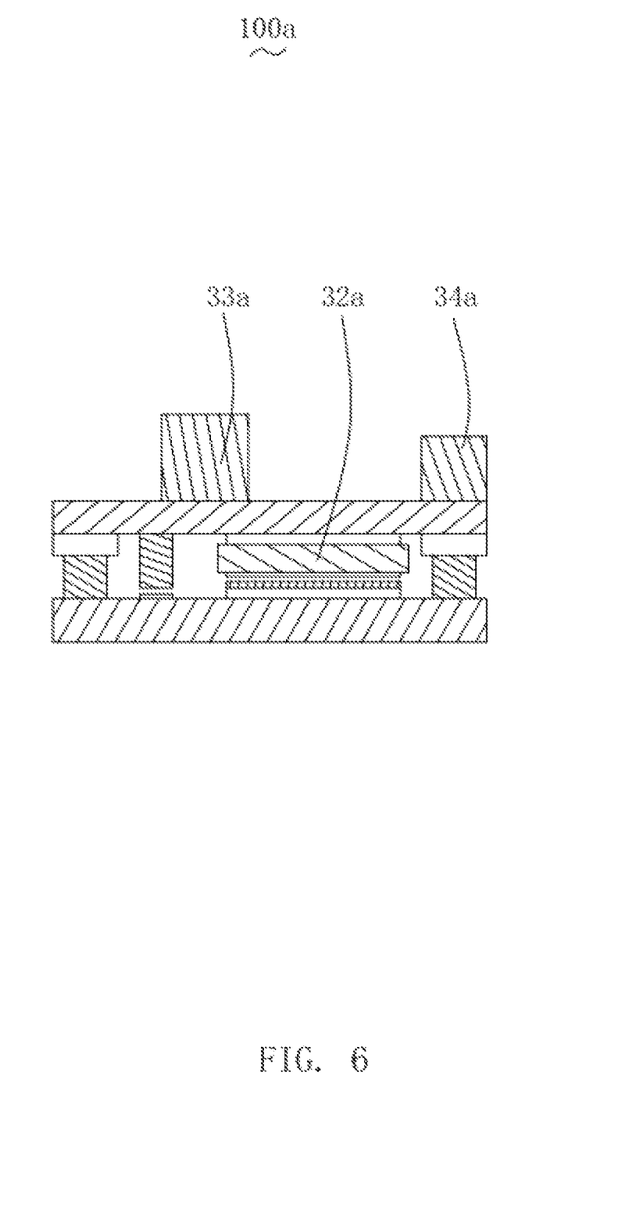
FIG. 6 is a schematic structural view of the multi-rotor direct drive transmission system in the second embodiment of the present disclosure from another perspective.

A multi-rotor direct drive transmission system 100a is further provided according to the second embodiment of the present disclosure. The multi-rotor direct drive transmission system 100a is basically the same as the multi-rotor direct drive transmission system 100 in the first embodiment in structure. The difference between the multi-rotor direct drive transmission system 100*a* and the multi-rotor direct drive transmission system 100 in the first embodiment is as follows.

Reference is simultaneously made to FIG. 5 to FIG. 6. The power supply unit 34*a* of the multi-rotor direct drive transmission system 100*a* is different from the power supply unit 34 of the multi-rotor direct drive transmission system 100 in the first embodiment.

The power supply unit 34*a* of the multi-rotor direct drive transmission system 100*a* in the second embodiment of the present disclosure is a battery. The battery is a battery with sufficient power and can be installed directly without additional charging. For example, a lithium battery or a storage battery.

The power supply unit 34*a* is electrically connected to a winding 32*a* and a drive device 33*a*, respectively.

Of course, since the power supply unit 34*a* is a battery, the power supply unit 34*a* of the multi-rotor direct drive transmission system 100*a* does not need to be provided with the conductive strip 4 of the multi-rotor direct drive transmission system 100 in the first embodiment.

The multi-rotor direct drive transmission system 100*a* in the second embodiment of the present disclosure can achieve various implementation methods and corresponding beneficial effects in the multi-rotor direct drive transmission system 100 in the first embodiment, which will not be repeated here to avoid repetition.

Third Embodiment

Figure 7:
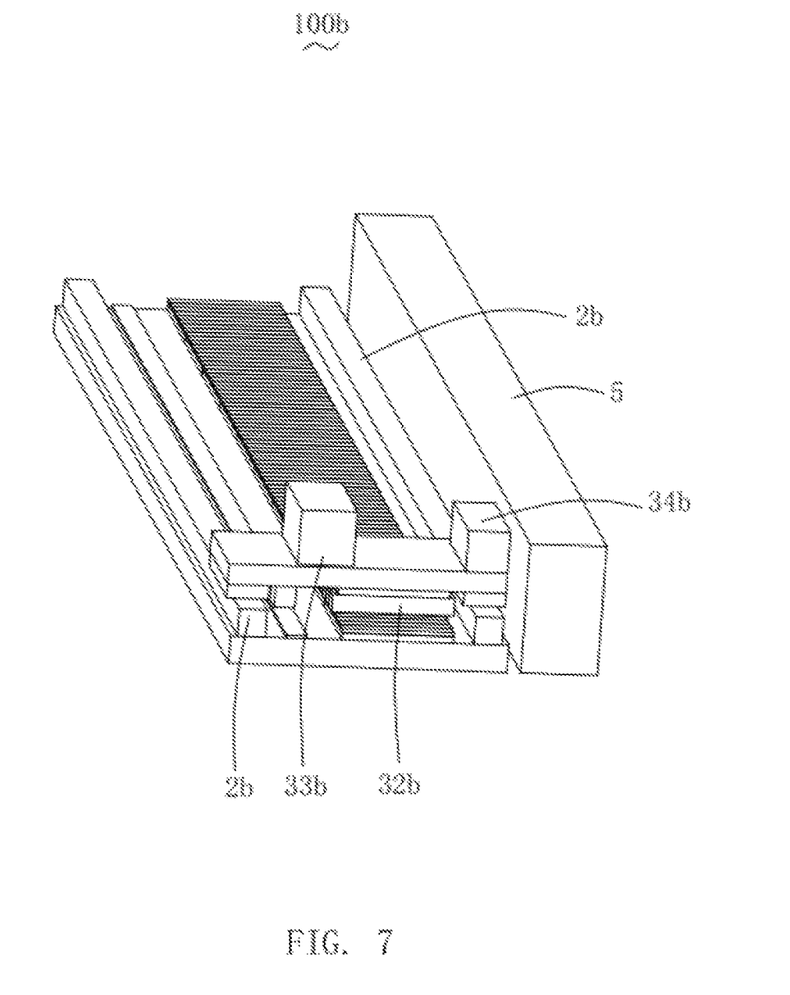
FIG. 7 is a schematic three-dimensional structural view of a multi-rotor direct drive transmission system in a third embodiment of the present disclosure.
Figure 8:
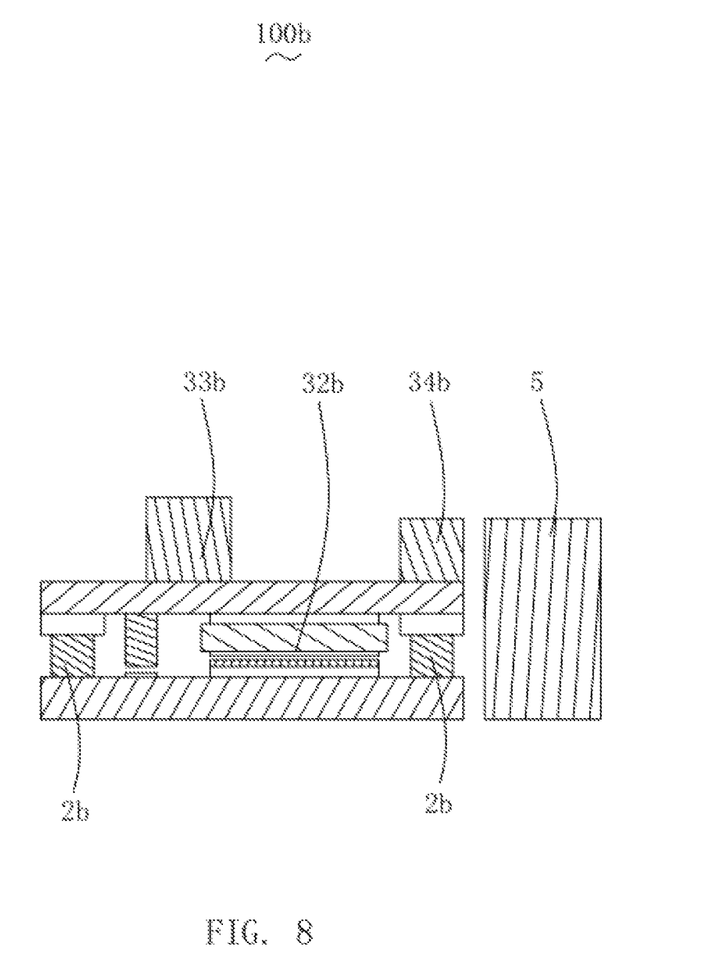
FIG. 8 is a schematic structural view of the multi-rotor direct drive transmission system in the third embodiment of the present disclosure from another perspective.

A multi-rotor direct drive transmission system 100*b* is further provided according to the third embodiment of the present disclosure. The multi-rotor direct drive transmission system 100*b* is basically the same as the multi-rotor direct drive transmission system 100*a* in the second embodiment in structure. The difference between the multi-rotor direct drive transmission system 100*b* and the multi-rotor direct drive transmission system 100*a* in the second embodiment is as follows.

Reference is simultaneously made to FIG. 7 to FIG. 8. The power supply unit 34*b* of the multi-rotor direct drive transmission system 100*b* is different from the power supply unit 34*a* of the multi-rotor direct drive transmission system 100*a* in the second embodiment.

The power supply unit 34*b* is a wireless chargeable battery. The power supply unit 34*b* is electrically connected to a winding 32*b* and a drive device 33*b*, respectively.

In order to achieve wireless charging of the power supply unit 34*b*, the multi-rotor direct drive transmission system 100*b* in the third embodiment of the present disclosure is provided with an additional charging device compared to the multi-rotor direct drive transmission system 100*a* in the second embodiment. Specifically, the multi-rotor direct drive transmission system 100*b* further includes a wireless charging device 5 configured to wireless charge the power supply unit 34*b*, and at least a part of stroke by which the power supply unit 34*b* moves and extends along the guide rail 2*b* is in a wireless charging range of the wireless charging device 5.

The multi-rotor direct drive transmission system 100*b* in the third embodiment of the present disclosure can achieve various implementation methods and corresponding beneficial effects in the multi-rotor direct drive transmission system 100 in the first embodiment, which will not be repeated here to avoid repetition.

Compared with the conventional art, the multi-rotor direct drive transmission system provided according to the present disclosure provides a magnetic steel in a stator unit, a winding in the rotor unit, where the winding is spaced and arranged opposite to the magnetic steel. The winding drives the magnetic steel to cause the rotor unit to move along the guide rail. This structure uses fewer devices and has a simple structure, which is beneficial for reducing costs. The multi-rotor direct drive transmission system of the present disclosure is provided with a drive device and a power supply unit in the rotor unit, and the structure is directly controlled by the rotor unit to power on or off the winding, so that the control system is relatively simple, which is conducive to realize easy control and use of the multi-rotor direct drive transmission system of the present disclosure. Furthermore, the power supply unit is provided in multiple forms of power supply, including the movable cable, the battery, and the wireless chargeable battery, which is beneficial for the implementation of the multi-rotor direct drive transmission system of the present disclosure to be easy to control and use.

The above are only the embodiments of the present disclosure. It should be pointed out that for those of ordinary skill in the art, improvements may be made without departing from the inventive concept of the present disclosure, and these improvements shall fall within the scope of protection of the present disclosure.

What is claimed is:

1. A multi-rotor direct drive transmission system, wherein the multi-rotor direct drive transmission system is in data communication with an external control system and powered by an external power supply, the multi-rotor direct drive transmission system comprises a plurality of stator units connected in sequence, a guide rail attached to the plurality of stator units, and a plurality of rotor units forming a sliding connection with the guide rail;
    wherein each of the plurality of stator units comprises a stator made of a conductive magnet and a magnetic steel fixed to the stator, and the guide rail is attached to the stator;
    wherein each of the plurality of rotor units comprises a rotor made of a conductive magnet, a winding fixed to the rotor, a drive device, and a power supply unit, and the rotor forms a sliding connection with the guide rail; the winding is spaced and arranged directly opposite to the magnetic steel, the winding is configured to drive the magnetic steel to cause the each of the plurality of rotor units to move along the guide rail, the drive device is electrically connected to the winding to control the winding to be powered on or powered off, and the drive device is connected to the external control system by wireless communication for data communication;
    wherein the multi-rotor direct drive transmission system further comprises a conductive strip configured to be connected to the external power supply, and the conductive strip is arranged in a spaced manner with the plurality of stator units and arranged in a direction parallel to an extending direction of the plurality of stator units;
    wherein the power supply unit is a movable cable, one end of the power supply unit is electrically connected to the winding and the drive device, respectively, and the other end of the power supply unit is slidably connected to the conductive strip to form a movable conductive structure;
    wherein each of the plurality of rotor units further comprises a first position feedback device fixed to the rotor, and the first position feedback device is electrically connected to the power supply unit; each of the plurality of stator units further comprises a second position feedback device fixed to the stator, and the second position feedback device is in data communication with the external control system;

wherein the first position feedback device and the second position feedback device are arranged opposite to each other, to cause the second position feedback device to sense position information of the first position feedback device and send the position information to the external control system.

2. The multi-rotor direct drive transmission system according to claim 1, wherein there are two guide rails parallel arranged and spaced along the extending direction of the plurality of stator units, the two guide rails are located on a same horizontal surface, and the first position feedback device, the second position feedback device, the winding, and the magnetic steel are all located between the two guide rails.

3. The multi-rotor direct drive transmission system according to claim 1, wherein the power supply unit comprises a first segment fixed to the rotor, a second segment bending and extending from the first segment towards a direction away from the rotor, and a third segment bending and extending from the second segment; the third segment is in sliding connection with the conductive strip to form a movable conductive structure.

4. A multi-rotor direct drive transmission system, wherein the multi-rotor direct drive transmission system is in data communication with an external control system, the multi-rotor direct drive transmission system comprises a plurality of stator units connected in sequence, a guide rail attached to the plurality of stator units, and a plurality of rotor units forming a sliding connection with the guide rail;

wherein each of the plurality of stator units comprises a stator made of a conductive magnet and a magnetic steel fixed to the stator, and the guide rail is attached to the stator;

wherein each of the plurality of rotor units comprises a rotor made of a conductive magnet, a winding fixed to the rotor, a drive device, and a power supply unit, and the rotor forms a sliding connection with the guide rail; the winding is spaced and arranged directly opposite to the magnetic steel, the winding is configured to drive the magnetic steel to cause the each of the plurality of rotor units to move along the guide rail, the drive device is electrically connected to the winding to control the winding to be powered on or powered off, and the drive device is connected to the external control system by wireless communication for data communication;

wherein the power supply unit is a battery, and the power supply unit is electrically connected to the winding and the drive device, respectively.

5. The multi-rotor direct drive transmission system according to claim 4, wherein each of the plurality of rotor units further comprises a first position feedback device fixed to the rotor, and the first position feedback device is electrically connected to the power supply unit; each of the plurality of stator units further comprises a second position feedback device fixed to the stator, and the second position feedback device is in data communication with the external control system;

wherein the first position feedback device and the second position feedback device are arranged opposite to each other, to cause the second position feedback device to sense position information of the first position feedback device and send the position information to the external control system.

6. The multi-rotor direct drive transmission system according to claim 5, wherein there are two guide rails parallel arranged and spaced along the extending direction of the plurality of stator units, the two guide rails are located on a same horizontal surface, and the first position feedback device, the second position feedback device, the winding, and the magnetic steel are all located between the two guide rails.

7. A multi-rotor direct drive transmission system, wherein the multi-rotor direct drive transmission system is in data communication with an external control system, the multi-rotor direct drive transmission system comprises a plurality of stator units connected in sequence, a guide rail attached to the plurality of stator units, and a plurality of rotor units forming a sliding connection with the guide rail;

wherein each of the plurality of stator units comprises a stator made of a conductive magnet and a magnetic steel fixed to the stator, and the guide rail is attached to the stator;

wherein each of the plurality of rotor units comprises a rotor made of a conductive magnet, a winding fixed to the rotor, a drive device, and a power supply unit, and the rotor forms a sliding connection with the guide rail; the winding is spaced and arranged directly opposite to the magnetic steel, the winding is configured to drive the magnetic steel to cause the each of the plurality of rotor units to move along the guide rail, the drive device is electrically connected to the winding to control the winding to be powered on or powered off, and the drive device is connected to the external control system by wireless communication for data communication;

wherein the power supply unit is a wireless chargeable battery, and the power supply unit is electrically connected to the winding and the drive device, respectively;

wherein the multi-rotor direct drive transmission system further comprises a wireless charging device configured to wireless charge the power supply unit, and at least a part of stroke by which the power supply unit moves and extends along the guide rail is in a wireless charging range of the wireless charging device.

8. The multi-rotor direct drive transmission system according to claim 7, wherein each of the plurality of rotor units further comprises a first position feedback device fixed to the rotor, and the first position feedback device is electrically connected to the power supply unit; each of the plurality of stator units further comprises a second position feedback device fixed to the stator, and the second position feedback device is in data communication with the external control system;

wherein the first position feedback device and the second position feedback device are set opposite to each other, to cause the second position feedback device to sense position information of the first position feedback device and send the position information to the external control system.

9. The multi-rotor direct drive transmission system according to claim 8, wherein there are two guide rails parallel arranged and spaced along the extending direction of the plurality of stator units, the two guide rails are located on a same horizontal surface, and the first position feedback device, the second position feedback device, the winding, and the magnetic steel are all located between the two guide rails.

\* \* \* \* \*